(No Model.)
G. B. ST. JOHN.
APPARATUS FOR SIGNALING THE APPROACH OF STREET CARS.
No. 527,461. Patented Oct. 16, 1894.
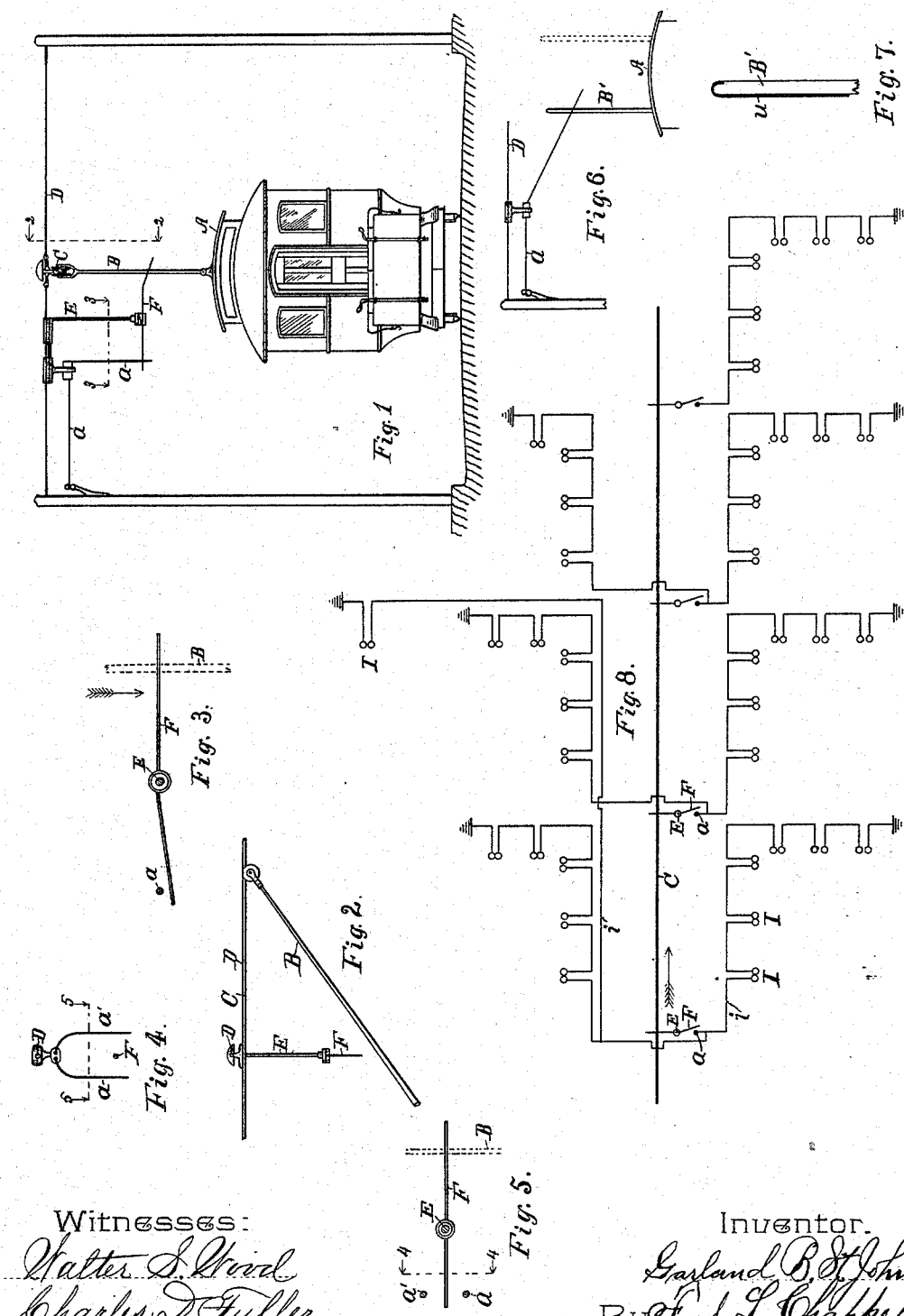

UNITED STATES PATENT OFFICE.

GARLAND B. ST. JOHN, OF KALAMAZOO, MICHIGAN, ASSIGNOR OF ONE-HALF TO CHARLES D. FULLER, OF SAME PLACE.

APPARATUS FOR SIGNALING THE APPROACH OF STREET-CARS.

SPECIFICATION forming part of Letters Patent No. 527,461, dated October 16, 1894.

Application filed November 27, 1893. Serial No. 492,085. (No model.)

*To all whom it may concern:*

Be it known that I, GARLAND B. ST. JOHN, a citizen of the United States, residing at the city of Kalamazoo, in the county of Kalamazoo and State of Michigan, have invented certain new and useful Apparatus for Signaling the Approach of Street-Cars, of which the following is a specification.

My invention relates to electric signals, particularly to automatic electric signals.

The object of my invention is to provide an apparatus for signaling to residents along the street and along side streets the approach of street cars so that any one desiring to ride on the car will have time to prepare themselves and reach the street car line after the communication is received, thus saving the watching and waiting now common where passengers are desirous of taking a car and to save, also, the frequent annoyance of being too late to take a car.

My invention is particularly adapted for use in connection with electric street cars now in common use.

I accomplish the object of my invention by means of the devices shown in the accompanying drawings, in which—

Figure 1 is an end view of a trolley electric car and my signal apparatus about to be operated by it. Fig. 2 is a side view of the trolley wire, trolley and apparatus taken on line 2—2 of Fig. 1. Fig. 3 is a view on line 3—3 of Fig. 1, looking down showing the relative position of the trolley pole and the signaling apparatus. Fig. 4 is an end view of the apparatus adapted to signal ahead when the car is moving in either direction. Fig. 5 is a view on line 5—5 of Fig. 4, looking down. Fig. 6 is a view of a modification of my invention. Fig. 7 is a detail view of the upright post B' shown in Fig. 6. Fig. 8 shows the system of signals and their manner of connection with the signaling devices which are to be operated by the passing car.

Similar letters of reference refer to similar parts throughout the several views.

In the main drawing an ordinary trolley electric car A is shown. The trolley pole B carries the trolley against the trolley wire C. The trolley wire C is supported by the cross wires D in the usual way.

To the under side of the cross wire D is attached the vertical wire E by any suitable insulator. To the lower end of this vertical wire E is securely attached a transverse wire F, one end of which is deflected slightly downward and across the path of the trolley pole B; the other end projecting away from the path of the trolley pole and across the vertical end of wire $a$, but not in contact with it.

The wire $a$ is attached by suitable insulators to the cross wire D above and is in electric contact with the wire passing to the various signals in its group.

It will be seen that the trolley pole of an electric car passing by this apparatus will strike against the end of the wire F and swing it around, which, in passing in one direction, will swing the opposite end of the wire F against the wire $a$, which will establish an electrical connection between the trolley pole B, and the wire $a$, which is attached to the wire $i$ connected with a group of signals ahead and will allow a current of electricity to pass from the trolley pole of the car through the said wire F and the wire $a$ into the wire $i$ connecting with the group of signals which may pass through a series of bells or other signals I. I., on through the entire system to ground plates at the end of the line; the electric circuit being completed through the ground in that way. When the car has passed, the torsion of wire E will cause the end of wire F to spring away from the vertical end of wire $a$.

When the electric car passes in the opposite direction the trolley pole will strike the wire F and carry it in the opposite direction away from the vertical end of wire $a$, and no electric circuit is formed. Consequently no signal is given, for, the car would be moving away from those people in that immediate vicinity and not approaching then. Thus it is seen by my apparatus that only the approach of a car is signaled.

In Figs. 4 and 5, I show my apparatus constructed to signal ahead when the car is moving in either direction, by merely using another wire $a'$ whose vertical end is on the opposite side of the cross wire F from wire $a$ which is brought in contact with wire F when the car moves in the opposite direction from that first indicated, the torsion of wire E keeping the end of wire F between the vertical ends of wires $a$ and $a'$ and out of contact with them, except when the car is passing. Thus it will be seen that the wires F and E are utilized to signal in both directions; it being understood that the wire $a'$ is connected with a group of signals in the opposite direction from the group of signals connected to wire $a$.

Fig. 8 shows the manner of grouping the signals in the system and their connections along the track.

But a single wire is used from each apparatus and is carried ahead to the various dwellings and through their signals so far as may be desired and attached to a ground plate at the end, thus completing the circuit.

Where the people are near, or on the street where the street car passes the signal wire $i$ is carried but a short distance ahead of the car, because only a short notice is necessary. Where people live at a considerable distance off on a side street a line as $i'$ is carried a considerable distance ahead so that they shall receive a longer notice of the approach of the car, because it is necessary for them to have longer notice.

It is needless to say that suitable switches could be placed near the signals to cut them out when it is not desired to know of the approach of the car. Of course, the same house or houses could be connected so that they would be signaled on the approach of a car from either direction by putting in separate signals for each purpose, or a single signal might be used with a proper switch for connecting it with either group, with a suitable indicator so that the prospective passenger could know from which direction a car was coming or could connect with a group to receive a signal from whichever direction he chooses.

In Figs. 6 and 7 a modification of the device for electrically connecting the signals with the car is shown. Instead of the trolley pole there is a small post B' which projects up from the roof of the car. The back side of this post B' is covered with a suitable insulator $u$. The wires F and E are dispensed with and the wire $a$ projects across the path of the post B'. When the car travels ahead the wire $a$ strikes the exposed side of post B' and as the post B' is connected through the trolley with the trolley wire or with a suitable electric battery placed in the car a circuit is completed and a signal given. When the car returns the insulated side of the post strikes the wire $a$, and no circuit is formed. Thus the signal is conveyed as before, only when the car is approaching.

Posts B' can be placed on both sides of the car and the car be made to signal in both directions in that way. The insulation however could be applied to one side of the wire $a$ and then no insulation would be needed on the post B'. By insulating the proper side of the wire $a$, the signal could be conveyed in whichever direction desired and but one post need be used.

I desire to say that my improved signaling apparatus can be greatly varied in its details, and still accomplish the purpose, I have shown, without departing from my invention. The contact might be made with any other part of the car than the trolley pole B or the post B', and answer the purpose just the same; but these parts projecting up to a considerable distance will be found preferable. Where the signals are to come from electric cars no other source of electricity need be provided. Where the cars are not electric a suitable battery can be placed in the car, one pole of which is connected through the wheels to the ground and the other connected with the upwardly projecting part which moves against a conductor to connect with the groups of signals of the system successively, thus making a single battery in the car serve to operate the entire system of signals.

My way of establishing electrical connection with the car and the signals can be used where there is a battery in the connecting line $i$ of each group of signals, but this last way indicated, while it would be better than no signal, would be expensive compared with the ways above indicated.

I desire to say, also, that the wire F and its relative parts might be suspended upon the car and be operated by having one end of the wire F strike the wire $a$ the same as the trolley pole strikes the wire F in the illustration. As this is a mere turning around of that device, it is not deemed necessary to show it in the drawings, the principle being entirely the same.

Having thus described my invention, what I claim as new, and desire to secure by Letters Patent, is—

1. The combination of an apparatus for signaling the approach of a street car, of the insulated vertical wire, E, the horizontal cross wire, F, attached thereto, one end of which projects across the path of a trolley pole; the vertical end of wire, $a$, in position to come in contact with the cross wire, F, when the wire, F, is swung by the car passing in one direction, and the signal wire, $i$, passing through a group of signals to a ground plate at the outer end and connected with the wire, $a$, at the outer end, substantially as described for the purpose specified.

2. In an apparatus for signaling the approach of a street car, the combination of the vertical insulated wire, E, the horizontal wire, F, attached thereto, one end of which wire, F, crosses the path of the trolley pole the opposite end projecting between the vertical ends of wires, $a$ and $a'$, and the wires, $a$ and $a'$, connected to groups of signals in opposite directions, the said wire, F, being adapted to be swung by the passing trolley pole into contact with the vertical wire, $a$, when moving in one direction, and the vertical end of wire, $a'$, when moving in the opposite direction, to convey signals of the approach of the car, substantially as described for the purpose specified.

3. In an apparatus for signaling the approach of a street car traveling over a single track roadway, the combination of a group of signals connected by a single wire, a suitable source of electric supply; and the circuit closer operated only by the car passing in one direction, that is, by its approach so that the signal operates momentarily while the car is approaching, for the purpose specified.

4. In an apparatus for signaling the approach of a street car traveling over a single track of a roadway, the combination with groups of signals connected with the circuit closers along the line, of an electric supply in the street car adapted to connect with the groups of signals successively by means of the circuit closers when the car passes the said circuit closers being operated by the car passing in only one direction so that the signals shall operate momentarily on the approach of the car, for the purpose specified.

5. In an apparatus for signaling the approach of a street car traveling over a single track roadway, the combination of a signal, a connecting wire running from said signal to the street car line, a circuit closer at the street car line operated only by the approach of the car, and an electric supply to pass through the connecting wire to operate the signal momentarily while the car is moving in only one direction, for the purpose specified.

6. In an apparatus for the purpose of signaling the approach of a street car, the combination of a signal, a connecting wire running from the signal to the street car line, an upwardly projecting post at the top of the car in electrical connection with the ground below the track adapted to strike the connecting wire when approaching to complete the circuit to allow an electric current from a suitable electric generator in the circuit to pass to operate the signal and a suitable insulator to prevent the post from striking the connecting wire and completing the circuit when the car is passing in the opposite direction so that the signal shall be operated only when the car approaches, for the purpose specified.

7. In an apparatus for the purpose of signaling the approach of a street car passing over a single track roadway, a part projecting into the path of a street car, an electrical conductor on said car adapted to strike said projecting part when the car moves in one direction and complete the circuit only when the car is moving in that direction, a connecting wire running forward from the projecting part in the direction of the car, a signal connected to said wire, and a suitable source of electrical supply to operate the signal momentarily on the approach of the car, for the purpose specified.

8. In an apparatus for signaling the approach of a street car traveling over a single track roadway, the combination of a signal, a connecting wire from said signal to the track, a part projecting normally into the path of the street cars, a means for closing the circuit operated by the motion of the projecting part, in but one direction, and a suitable electric generator connected in the circuit to operate the signal momentarily on the approach of the car, for the purpose specified.

9. In an apparatus for signaling the approach of street cars, the combination of a part projecting into the path of the cars, an insulator to keep the part from electrical contact with the car when moving in one direction, and a conductor of electricity to come in contact with a conductor of electricity in the car to complete a circuit when the car is moving in the opposite direction, a signal, a connecting wire from said part to the signal and a source of electric supply, for the purpose specified.

10. An apparatus for signaling the approach of street cars traveling over a single track of a roadway to possible passengers along the line, a part projecting normally into the path of the street car to be moved by it in either direction, the combination of a means for closing the circuit situated to one side of said part to be operated by it when it moves in that direction, a connecting line in the circuit running from said means for closing the circuit to as many signals as desired along the line, a suitable generator of electricity in the circuit to operate the signal momentarily, on the approach of the cars, for the purpose specified.

In witness whereof I have hereunto set my hand and seal in the presence of two witnesses.

GARLAND B. ST. JOHN. [L. S.]

Witnesses:
E. S. ROOS,
CHARLES D. FULLER.